May 14, 1940.  P. O. KROGH  2,200,555
METAL DOOR FRAME FOR AUTOMOBILES
Filed April 11, 1939  2 Sheets-Sheet 1
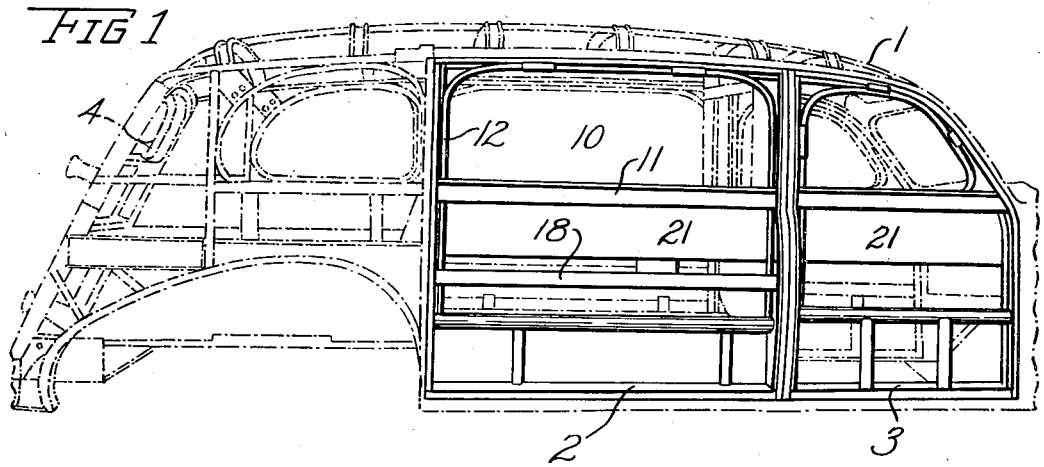
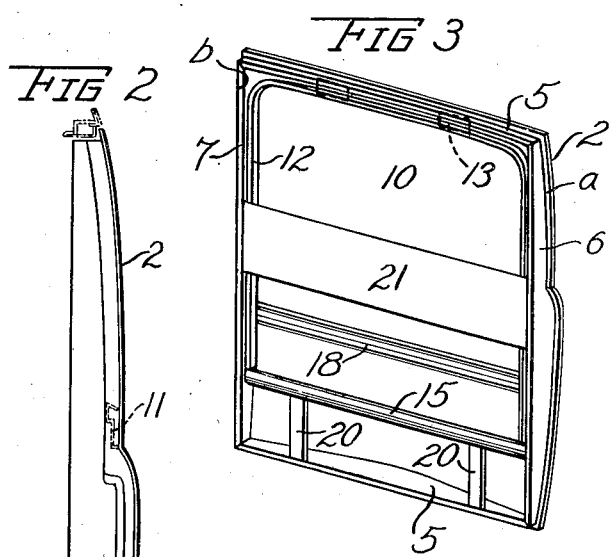
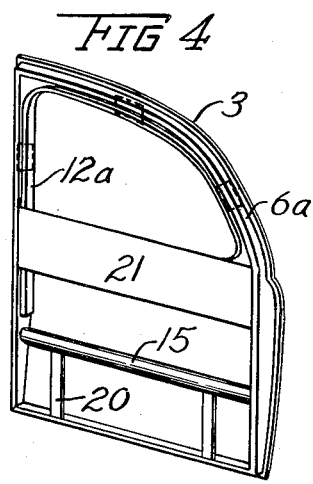
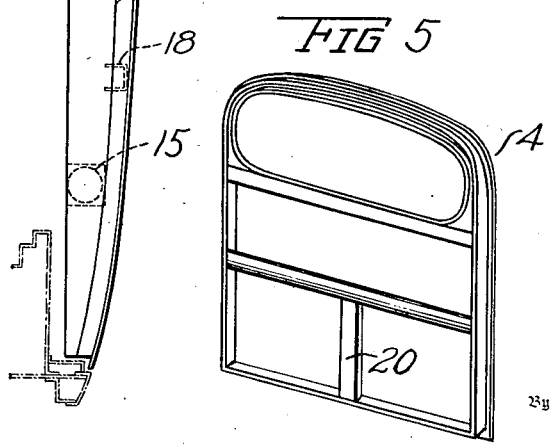
Inventor
Peter O. Krogh
By Owen & Owen
Attorneys.

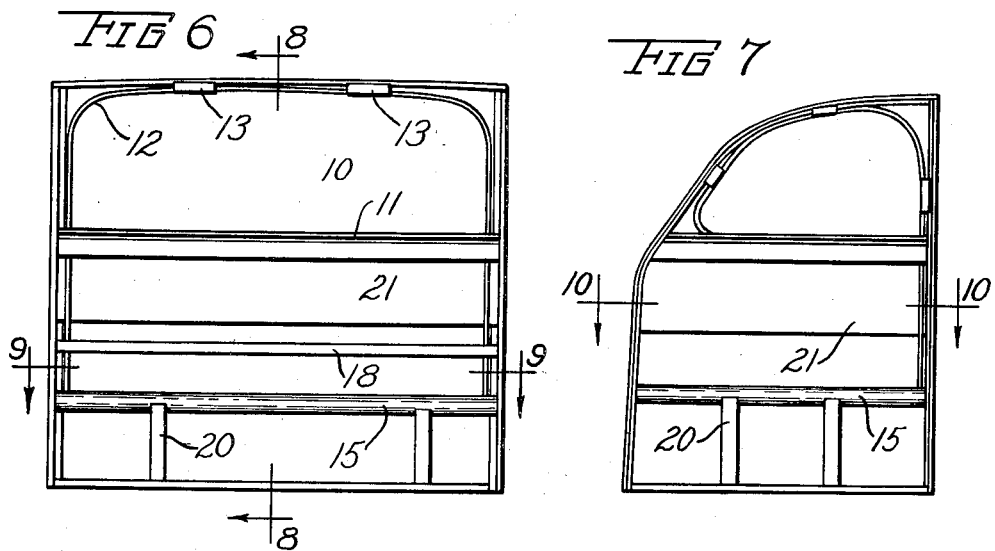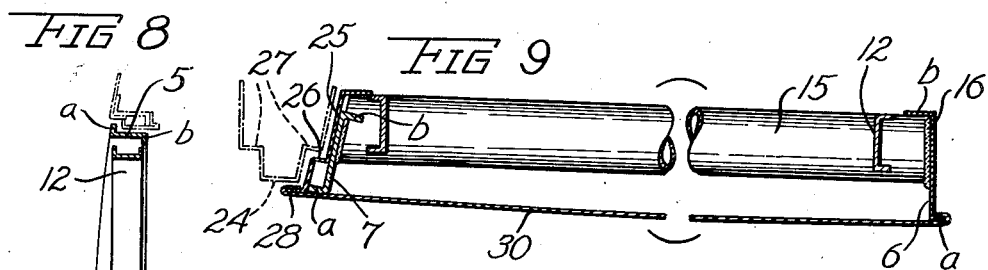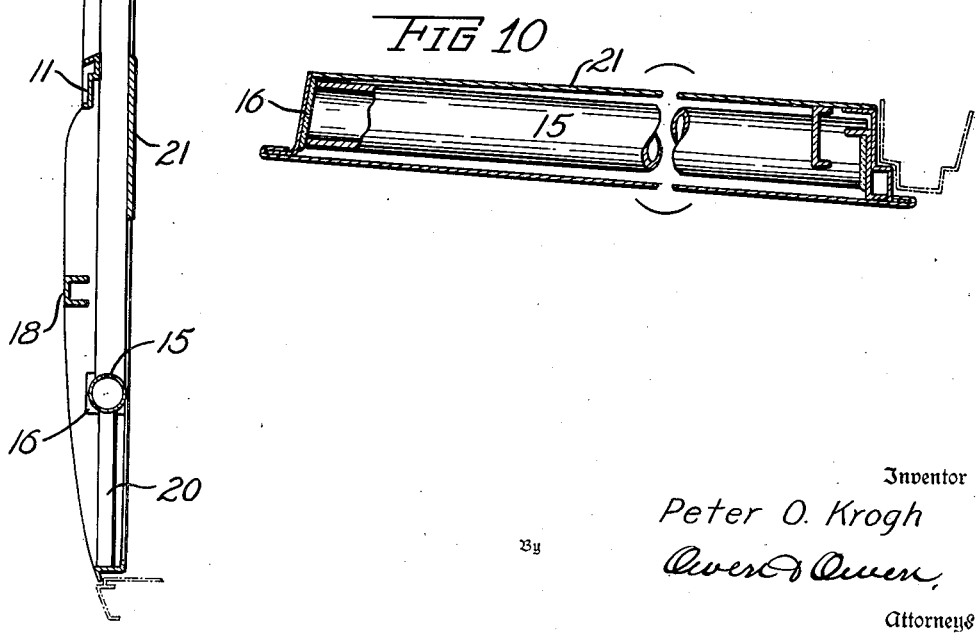

Patented May 14, 1940

2,200,555

UNITED STATES PATENT OFFICE 2,200,555

METAL DOOR FRAME FOR AUTOMOBILES

Peter O. Krogh, Lima, Ohio, assignor to Superior Body Company, Lima, Ohio, a corporation of Ohio Application April 11, 1939, Serial No. 267,278

2 Claims. (Cl. 296—44)

This invention relates especially to automobile bodies of the limousine type, such as used in ambulances and funeral cars, and more particularly to the door frames thereof of all-metal construction.

In doors of this character, lightness and strength are important items, and it is the primary object of the present invention to produce a frame therefor which embodies these features.

A further object of the invention is the provision of an all-metal frame for such doors, which is composed of comparatively few parts of such construction and so arranged as to produce a frame of simple, strong and economical construction, whereby to enhance the commercial value and practicability of doors of this type.

The invention is fully described in the following specification, and preferred embodiments thereof illustrated in the accompanying drawings, in which—

Figure 1 is a side elevation of an automobile body frame of the limousine type, with the side door frames thereof embodying the invention shown in full lines; Fig. 2 is a front edge view of the rear side door frame; Fig. 3 is a perspective inner side view of a rear side door frame; Fig. 4 is a similar view of a front side door frame; Fig. 5 is a similar view of the rear door; Fig. 6 is an outer side view of the rear side door frame; Fig. 7 is a similar view of the front side door frame; Fig. 8 is an enlarged vertical section on the line 8—8 in Fig. 6; Fig. 9 is an enlarged cross-section on the line 9—9 in Fig. 6, and Fig. 10 is a section on the line 10—10 in Fig. 7.

Referring to the drawings, I designates the skeleton frame of an automobile body like used in ambulances and funeral cars and having the door frames, in which the present invention resides, mounted therein. These doors, in the present instance, include two side doors 2 and 3 at each side of the body frame and a rear door 4. The doors 2 and 3 at the near side in Fig. 1 are shown in full lines. The doors 2 are disposed at the forward end of the main carrying compartment of the vehicle and are of a broad type to facilitate the movement of caskets and invalid carts therethrough, and the doors 3 are of a less width suitable for the sides of the driver's compartment.

While the frame structures of these several doors are in general the same, they differ in some minor respects as will be hereinafter pointed out. The invention, however, is of particular value in connection with a wide door to give it rigidity and strength with a minimum of weight.

Referring first to the wide door 2, shown particularly in Figs. 2, 3, 6, 8 and 9, its marginal or edge frame structure is composed of top and bottom Z-bars 5, 5, and opposed inner and outer side Z-bars 6 and 7, respectively, the bar 6 being at the hinge side and the bar 7 at the lock side of the door. These bars join at the corners and are rigidly attached together as by welding, and the outwardly projecting flange $a$ of each is at the front side while the inwardly projecting flange $b$ is at the rear side of the door. The bar 7, at the outer or swinging edge of the door, is preferably somewhat less in cross-sectional depth than the other bar, as shown in Fig. 9.

The upper portion of the door frame is provided with the customary window opening 10, the bottom of which is defined by the sill bar 11 extending from one to the other of the side bars 6 and 7 and welded thereto at its ends. The bar 11 is of irregular shape in cross-section, as shown in Figs. 2 and 8, to give it strength and to suit the purpose for which used, and is disposed in the forward portion of the frame at the front of the well opening into which the window glass (not shown) may be lowered.

The top and sides of the window opening 10 are defined by a U-shaped frame strip 12 of channel iron, which has its channel disposed outwardly and its top portion secured to the top frame bar 5 by welded tie pieces 13, or in any other suitable manner. The strip 12 is in the vertical plane of the door well and has its legs extending down into the well at the inner side of the sill bar 11 and preferably welded at its lower ends to a cross reinforcing bar 15, which is disposed between and welded at its ends to the inner sides of the respective side bars 6 and 7. The legs of the strip 12 may be connected at intervals to the respective side bars 6 and 7, by pieces 13 in the same manner that the top portion of such strip is secured to the top frame bar 5.

The cross bar 15 is hollow, being preferably of tubular form, and its provision in the door frame is of considerable importance, as it combines lightness with strength and rigidity, particularly when used with some of the other features of construction of the door frame. To facilitate strong attaching of the bar ends to the side frame bars 6, 7, a plate member 16 is welded to each end of the bar 15, and provides a broadened seat against the respective side frame bar to facilitate welding thereto, The side frame bars 6, 7, may be connected above the bar 15 by a cross-bar 18, shown, in the present instance, as of channel iron form, and disposed at the front side of the leg portions of the strip 12 and welded thereto and to the side bars 6, 7.

Short vertical stiffening bars 20 extend from the tubular bar 15 down to the bottom frame bar 5, being welded to each and cooperating with said bar 15 to more effectually brace and strengthen the door frame against twisting and sagging.

A plate 21 connects the side frame bars 6, 7, at their inner side edges, to which it is welded, and at the inner side of the sill bar 11 in spaced relation thereto, and serves to carry the door lock and the customary window control mechanism (not shown).

The outer side frame bar 7, which is disposed at the swinging edge of the door, is preferably set at a slight cross angle to the inner bar 6, or out-of-parallelism therewith in a crosswise direction, to conform to the customary taper of the stop pillar 24 of the body frame with which the door coacts, and such bar 7 is faced with a strip 25 (Fig. 9), which is formed with a longitudinally extending shoulder 26 in coacting register with a shoulder 27 on said pillar. The strip 25 is welded to the door frame bar 7 and has its inner edge flanged inwardly at the inner side of the door and has its outer edge abutting the outer edge of the flange $a$ of the bar 7 and flanged outwardly therefrom in the plane thereof, as shown at 28 in Fig. 9. The respective edges of the front panel sheet 30 of the door are rolled around the flange 28 and the outer edge flanges $a$ of the top, bottom and rear edge bars 5, 5 and 6 of the door frame.

The front door 3 and rear door 4 are of substantially the same construction as the broad side doors 2, except as to minor features. For instance, in the front door 3, the upper forward corner is curved or fashioned to conform to the sloping front end of the body frame 1, and in this case a single side bar $6a$ may form the front and top edges of the door frame, or such bar may be of sectional form welded together, if desired. In this door, the cross bar 18 is omitted and only one end of the window defining strip $12a$ is extended down into the door well to the tubular bar 15.

The other end of the strip $12a$ may terminate in any desired position below the window opening.

It is found in practice that an all-metal door frame constructed substantially as above-described, and provided in particular with a tubular cross reinforcing bar 15, produces a door frame which is comparatively light and is exceedingly strong against sagging and twisting and is also comparatively inexpensive to construct.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. An all-metal door frame of the class described having top, bottom, inner and outer side edge bars rigidly joined at their ends and of angle form in cross-section with their web or body portions facing each other, and a tubular reinforcing bar disposed between the inner and outer edge bars and rigidly connected at its ends to the web portions of such bars, and a window defining strip extending across the inner side of said top edge bar and fixedly connected thereto and also extending down at the inner side of each side edge bar to and fixedly attached to said cross bar.

2. An all-metal door frame of the class described having top, bottom, inner and outer side edge bars rigidly joined at their ends and of angle form in cross-section with their web or body portions facing each other, and a hollow reinforcing bar disposed between the inner and outer edge bars and rigidly connected at its ends to the web portions of such bars, one or more vertical reinforcing bars extending from said tubular bar to the bottom edge bar and fixedly attached to each, a window defining channel-bar strip extending across the inner side of said top edge bar and fixedly attached thereto and extending down along the inner side of at least one of said side edge bars and attached thereto, and additional cross bar members rigidly connecting said side edge bars below the window portion of the door frame.

PETER O. KROGH.